(12) United States Patent
Young et al.

(10) Patent No.: US 8,595,765 B2
(45) Date of Patent: Nov. 26, 2013

(54) NEXT GENERATION USER INTERFACE FOR AUDIO VIDEO DISPLAY DEVICE SUCH AS TV

(75) Inventors: David Young, San Diego, CA (US); Steven Friedlander, San Diego, CA (US); Sabrina Tai-Chen Yeh, Laguna Beach, CA (US)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 13/186,806

(22) Filed: Jul. 20, 2011

(65) Prior Publication Data

US 2012/0260285 A1 Oct. 11, 2012

Related U.S. Application Data

(60) Provisional application No. 61/473,098, filed on Apr. 7, 2011.

(51) Int. Cl.
*G06F 13/00* (2006.01)

(52) U.S. Cl.
USPC .............. 725/37; 725/38; 725/39; 725/44; 725/46; 725/47; 725/135

(58) Field of Classification Search
USPC ................. 725/37–39, 44–47, 135
See application file for complete search history.

(56) References Cited

U.S. PATENT DOCUMENTS

| | | |
|---|---|---|
| 2007/0011702 A1* | 1/2007 | Vaysman .................. 725/45 |
| 2008/0189740 A1* | 8/2008 | Carpenter et al. ............. 725/38 |
| 2009/0174680 A1 | 7/2009 | Anzures et al. |
| 2010/0153885 A1* | 6/2010 | Yates ........................ 715/841 |
| 2010/0235770 A1* | 9/2010 | Ording et al. ................ 715/765 |
| 2011/0126148 A1 | 5/2011 | Krishnaraj et al. |

* cited by examiner

*Primary Examiner* — Jivka Rabovianski
(74) *Attorney, Agent, or Firm* — John L. Rogitz; John M. Rogitz

(57) ABSTRACT

A viewer of an audio video display device (AVDD) and transition from a nine panel graphical user interface (GUI) showing a summary degree of metadata to a six panel GUI showing a higher degree of metadata using a horizontal motion.

18 Claims, 4 Drawing Sheets

SYSTEM

EXAMPLE REMOTE CONTROL

GUI (COARSE)

GUI (FINE)

NEXT GENERATION USER INTERFACE FOR AUDIO VIDEO DISPLAY DEVICE SUCH AS TV

This application claims priority to U.S. provisional patent application Ser. No. 61/473,098, filed Apr. 7, 2011.

FIELD OF THE INVENTION

The present application relates generally to user interfaces (UI) for audio video display devices (AVDD) such as televisions (TVs).

BACKGROUND OF THE INVENTION

The nature of a dynamic society propels an ever-increasing variety of tastes for forms of entertainment, such as television. Rarely does a viewer find enjoyment in literally every TV program available, and thus the necessity to hone in on a specific genre in programming emerges. The current generation of program guides has enabled viewers to rapidly search through programs on an increasing number of channels rather than "surfing" by selecting one channel at a time in sequence.

A viewer may never elect to watch a particular program because of a preconceived notion about the nature of the show. For example, a person with an interest in medicine but a lack thereof in government may chose not to watch a show involving government agencies involved in the medical industry simply because the show contains a portrayal of a government-related issue. The complexity of modern TV programming calls for a corresponding complex user interface that will help guide the viewer to make a program selection.

SUMMARY OF THE INVENTION

According to principles set forth further below, an audio video display device (AVDD includes a processor and a video display presenting demanded images under control of the processor. A computer readable storage medium bearing instructions executable by the processor is also included. The instructions direct presentation of a first graphical user interface (GUI) on the display. The first GUI includes a first number of information panels each being associated with respective content that can be played on the AVDD. At least some panels in the first GUI present a summary degree of metadata describing the respective content. The instructions executable by the processor also direct the presentation of a second GUI on the display in response to a viewer motion. The second GUI includes a second number of information panels each being associated with respective content that can be played on the AVDD. Further, the second number is fewer than the first number in the first GUI, and at least some, panels in the second GUI presenting a detailed degree of metadata that describes the respective content. The detailed degree includes more metadata than the summary degree.

The number of information panels in the first GUI can be nine and the number of information panels in the second GUI can be six. The nine information panels in the first GUI may be arranged in three rows of three and the six information panels in the second GUI may be arranged in two rows of three. The six panels in the second GUI may alternatively be arranged in three rows of two.

The latter six panels in the second GUI, presented in response to viewer motion, which can be a horizontal click and drag motion with an input device, can be respectively associated with video content which is associated with respective panels in two of the three rows of panels in the first GUI. The two rows of panels in the first GUI that correspond to the panels in the second GUI may be a top row and a middle row of panels in the first GUI. All six panels in the second GUI can be larger than any panel in the first GUI.

In another aspect, a method is disclosed for enabling a viewer of an audio video display device (AVDD) to transition from a first graphical user interface (GUI) showing a summary degree of metadata to a second GUI showing a higher degree of metadata. The method includes receiving a user motion input, correlating the input to a command to transition to the second GUI, and responsive to the command, removing the first GUI from the AVDD and presenting the second GUI on the AVDD.

In another aspect, an apparatus includes a user input device and a display device that receives, signals from the user input device generated by translational motion of a person's hand against the input device. A processor responsive to the first one of the signals changes a level of metadata presented on the display device from more to less metadata, or from less to more metadata.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
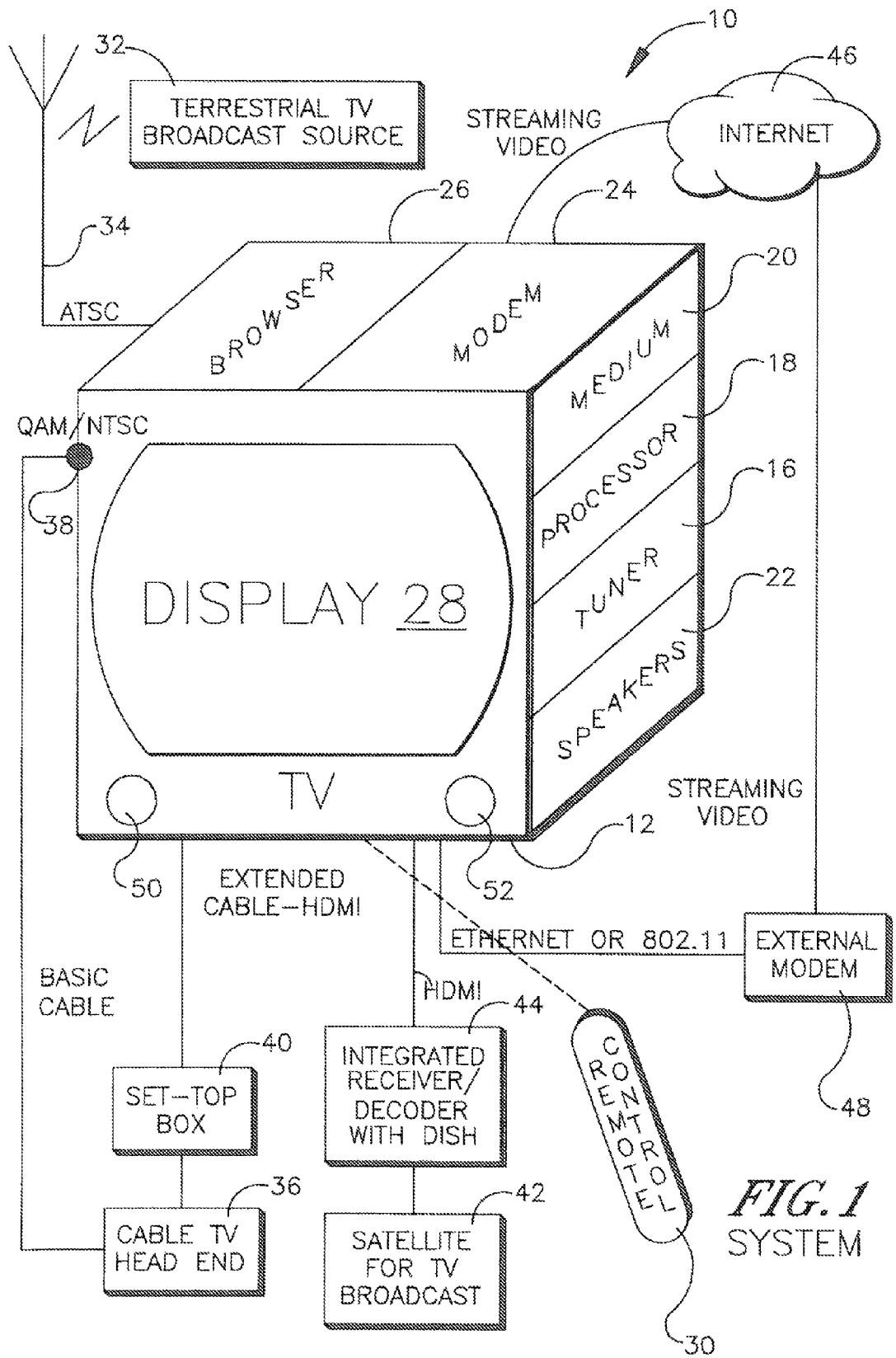
FIG. 1 is a block diagram of a non-limiting example system in accordance with present principles.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 18 which may execute a software-implemented browser 26. Video is presented under control of the TV processor 18 on a TV display 28 such as but not limited to a high definition TV (HDTV) flat panel display, and may be a touch screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an, extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 18 to provide to the processor 18 video images of viewers looking at the display 28. Furthermore, a microphone 52 may be provided on the chassis or separate therefrom and can be electrically connected to the processor 18 to provide viewer-generated voice commands to the processor 18.

Figure 2:
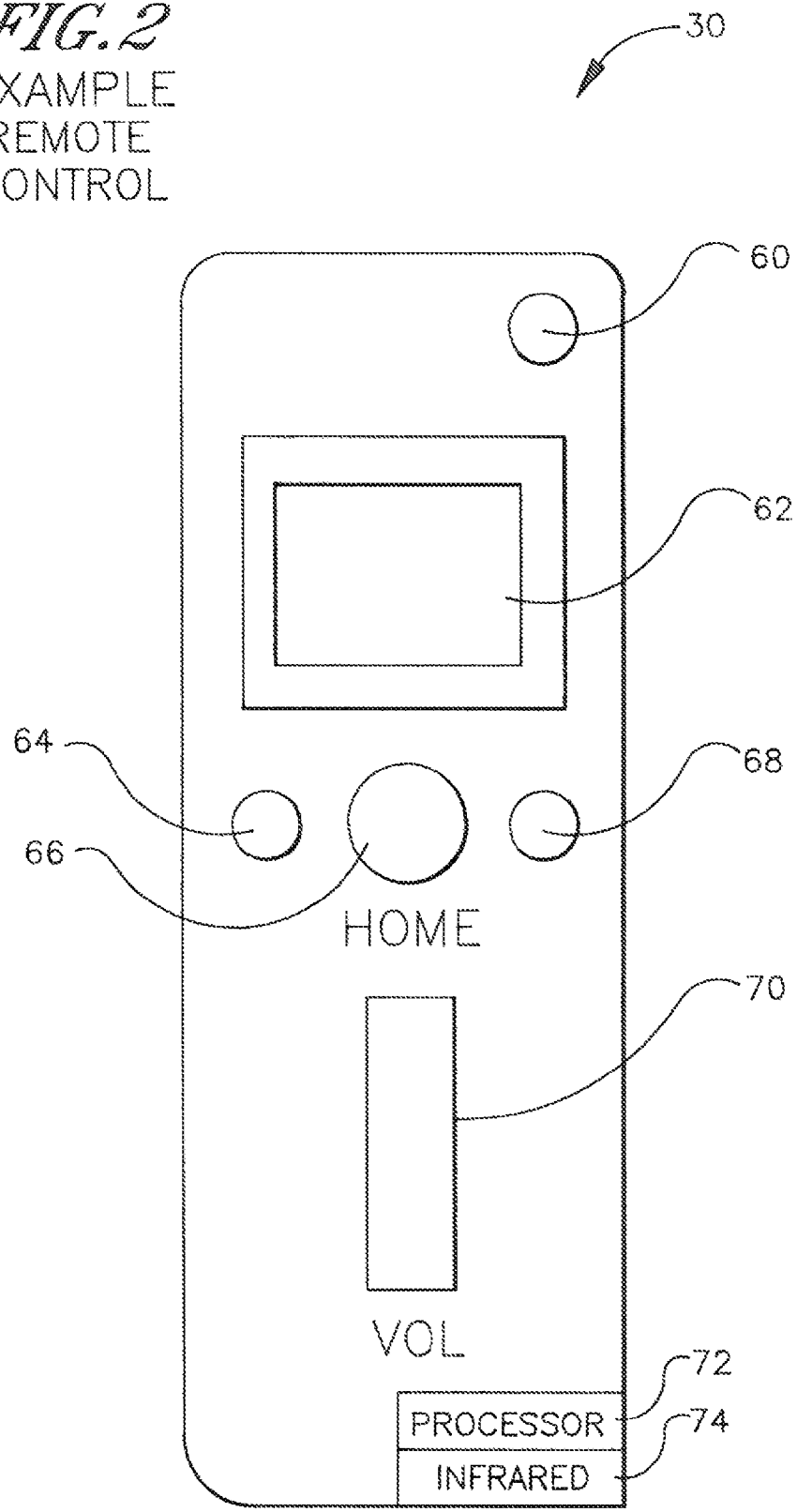
FIG. 2 is a plan view of an example remote control (RC) that may be used to control the graphical user interfaces (GUI) described herein, schematically showing the processor and wireless transceiver.

FIG. 2 shows that an example RC 30 may include a power on key 60 that can be toggled to energize and deenergize the AVDD 12. A touch-sensitive pad 62 may be provided against which a user can move his finger to correspondingly move a screen cursor on the display 28. Tapping the pad 62 can generate a "select" signal, it being understood that point-and-click devices other than the touch sensitive pad 62 may be used.

Also, a back key 64 may be provided to cause the display 28 to go back a screen shot, i.e., to present the screen shot immediately prior to the one being displayed when the back signal is generated, so as to enable a user to navigate through the various GUIs shown herein. A home key 66 may be provided to cause the below-described "home" GUI to be presented on the display 28, and an options key 68 may be provided to allow a user to cause a list of GUI options to be presented in the display 28. Volume output by the speakers ~21 of the AVDD 12 can be controlled using a volume up/down rocker key 70. Manipulation of a key or the pad 62 on the RC 30 causes a respective signal to be sent to an RC processor 72 in the RC 30, which transmits the corresponding command to the AVDD 12 using a wireless transceiver 74 such as but not limited to an infrared transceiver. In addition, if desired four arrow keys may be arranged on the RC 30 to move a cursor up, down, left, and right on the display 28. Also, channel up/down keys may be provided as well as a microphone for voice input. A full QWERTY keyboard or keypad may be provided if desired. The touch pad 62 may be provided with a buzzer or other device to generate tactile feedback to the user.

Figure 3:
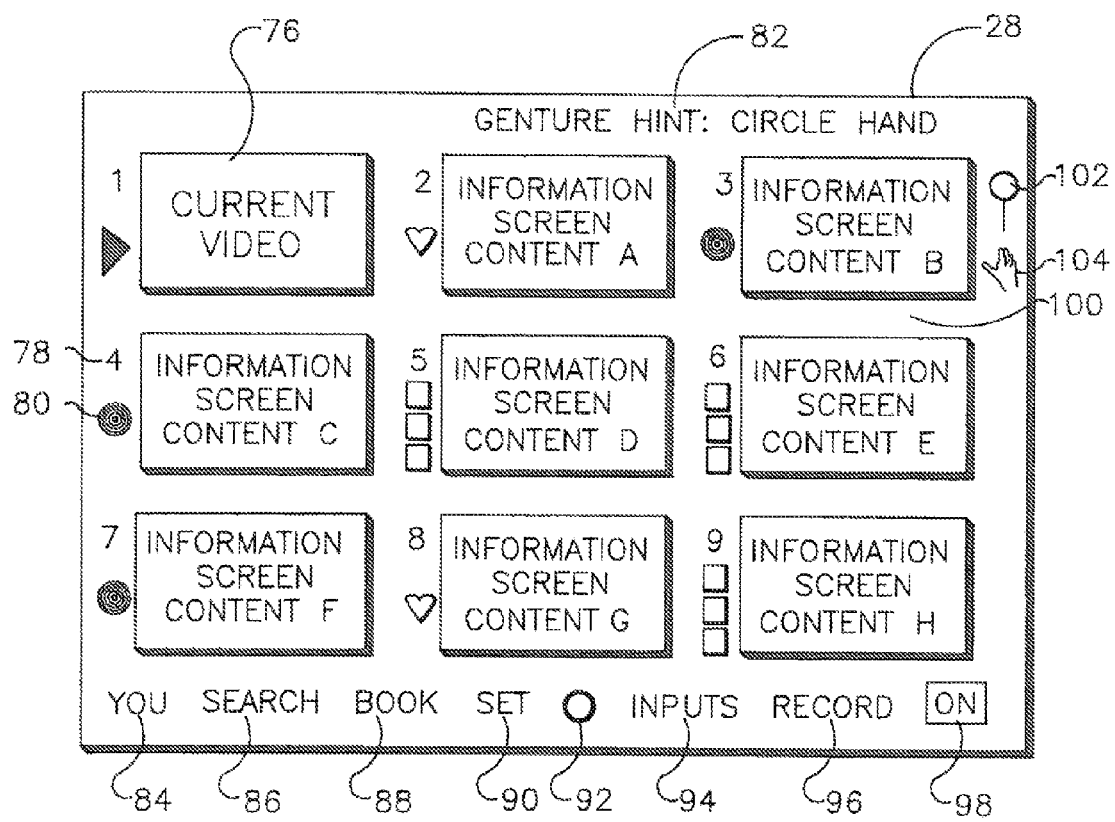
FIG. 3 is a screen shot of a nine panel GUI in a summary mode suitable for gesture control.
Figure 4:
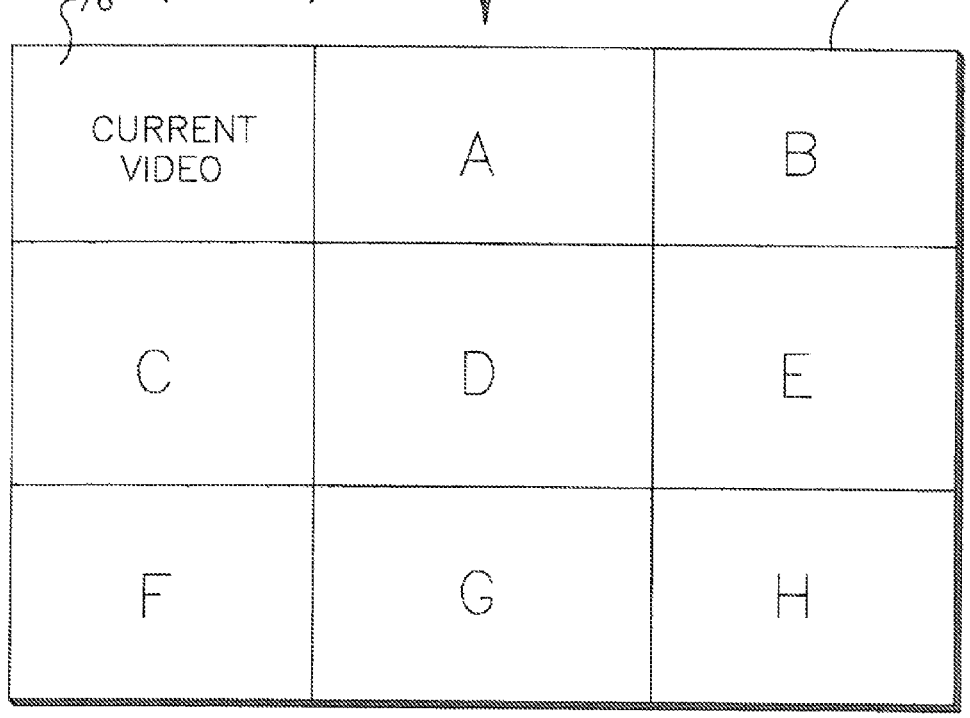
FIG. 4 is a screen shot of a nine panel GUI in a fine mode suitable for RC control.

FIGS. 3 and 4 show an example home GUI that may be presented on the display 28 of the AVDD 12. In the embodiment shown in FIG. 3, nine information panels arranged as shown in three rows of three panels each present visual content. The panels shown in FIG. 3 are of equal size with each other and are rectangular as shown. According to the embodiment shown in FIG. 1, the top left panel 76 of the GUI always shows the currently selected video content, typically either televised content from a selected TV channel or streaming video from a selected website. Information pertaining to available video content is presented in the other, eight panels. This information typically includes a photograph or other image, a content source logo indicating the source of the content represented by the panel, and text typically describing the title of the content and other information.

As shown at 78, a numeral may be provided next to each panel, so that the panels may be numbered onscreen from one to nine as shown. This facilitates a user selecting to play video content from a panel by saying the numeral associated with the panel. Also, as shown at 80 a genre indicator may be presented next to each panel. The genre indicator may be an arrow in the case of the first panel 76 indicating that the first panel 76 is presenting the currently selected video. The genre indicator may be a heart (as shown in FIG. 3 for panel 2) indicating the underlying video content has been selected by the user as a "favorite". Other genre indicators may be presented respectively representing "history", meaning that the content associated with the panel had been presented previously, "recommended", meaning that the content associated with the panel is recommended by a recommendation engine executed by the AVDD processor 18, and so on, e.g., "frequently viewed", "promotional content". A user can select to present panels associated with content of only a single genre.

Additionally, if desired the GUI shown in FIG. 3 may present gesture hints 82, describing in text and/or animated hand motion a gesture and its associated command that the user may make, which can be captured by the camera 50 and correlated to the respective command by the processor 18 executing image recognition software. Further, a menu of selections may be presented as shown along the bottom of the GUI, including a "just for you" selector 84 to cause the GUI to contain panels with content personalized to a recognized user. A search selector 86 can be selected to cause a search for a user-input term to be executed. Also, a bookmark selector 88 can be selected to bookmark the currently playing video in panel 76 or to bookmark content in a panel over which the screen cursor is positioned.

Still referring to FIG. 3, a settings selector element 90 if selected causes a setting menus to be presented to control settings of the GUI. A queue selector element 92 may be presented to cause a list of enqueued programs to be presented on the display 28, and an inputs selector element 94 may be presented, selection of which causes a list of available input sources, e.g., "disk player, cable, satellite" to be presented, on the display 28. A recommendations selector element 96 may be presented and if selected causes a list of recommended programming to be presented on the display 28. The list may be generated by a content recommendation engine such as the "Navi" engine made by Sony Corp. A "what's on" selector element 98 may be provided and if selected causes a list of current and future programs such as an electronic program guide (EPG) to be presented on the display 28. Indeed, an EPG may be presented in one of the panels shown in FIG. 3.

In any case, as mentioned above in the example shown the currently selected video content is always presented in the upper left panel 76 of the GUI. Should the user select another panel by using the RC 30 or by speaking the number of the panel or by the appropriate gesture captured by the camera 50, video content from the source associated with the selected panel automatically replaces the video content which was presented in the upper left panel 76 prior to receiving the new select signal. Indeed, should the user scroll the panels left or right to view additional content the upper left panel 76 remains unmoving as the other panels move on and off the display 28 as they are replaced by previously hidden content panels, with the upper left panel 76 always showing the currently selected video program.

The panel layout shown in FIG. 3 is somewhat coarse in that a visible border space 100 of many pixels width exists between adjacent panels as shown. Such a coarse representation facilitates control using gestures, although navigation by voice and by use of the RC 30 is always preferably enabled regardless of whether the GUI is in the coarse or fine view. FIG. 4 shows that if the user selects the fine view, the border space 100 disappears between adjacent panels, a view more suitable for RC control than gesture control although as stated above all three modes of command input (RC, voice, and gesture) remain enabled simultaneously with each other if desired.

Transition between the two views of FIGS. 3 and 4 may be effected by an appropriate hand gesture (e.g., a vertical motion of the hand) or by an appropriate voice command (e.g., "fine" or "coarse"), or by selecting, using the RC 30, "fine" or "course" from a settings menu accessed by selecting the settings selector element 90 or by pressing a key on the RC 30 or by simply grasping the RC, which is detected by the camera 50 and inferred by the processor 18 to correlate to a command to move to the "fine" screen of FIG. 4. The larger panels in the fine mode of FIG. 4 can be used to present more information than is presented in the panels of FIG. 3.

The GUI shown in FIGS. 3 and 4 may be removed from the screen and the currently playing video presented on the full display 28 by, e.g., toggling the home key on the RC 30. Voice command input may be enabled by voicing a phrase such as "hello TV", which is detected by the microphone 52 and using voice recognition software correlated by the processor 18 to a command to enable voice commands. Voice input may also be enabled using the RC 30 to select the "search" selector element 86. To indicate that voice commands are enabled, an icon such as an image of a microphone 102 can be presented on the display 28. Gesture command input may be enabled by waving the hand, which is detected by the camera 50 and using image recognition software correlated by the processor 18 to a command to enable gesture commands. To indicate that gesture commands are enabled, an icon such as an image of a hand 104 can be presented on the display 28.

Non-limiting examples of corresponding RC, voice, and gesture commands that accomplish the same tasks are:

| RC COMMAND | VOICE COMMAND | GESTURE |
|---|---|---|
| Channel up | "Channel up" | upward motion of hand |
| Channel down | "Channel down" | downward motion of hand |
| Volume decrease | "Quieter" | thumb down |
| Volume increase | "louder" | thumb up |

Figure 5:
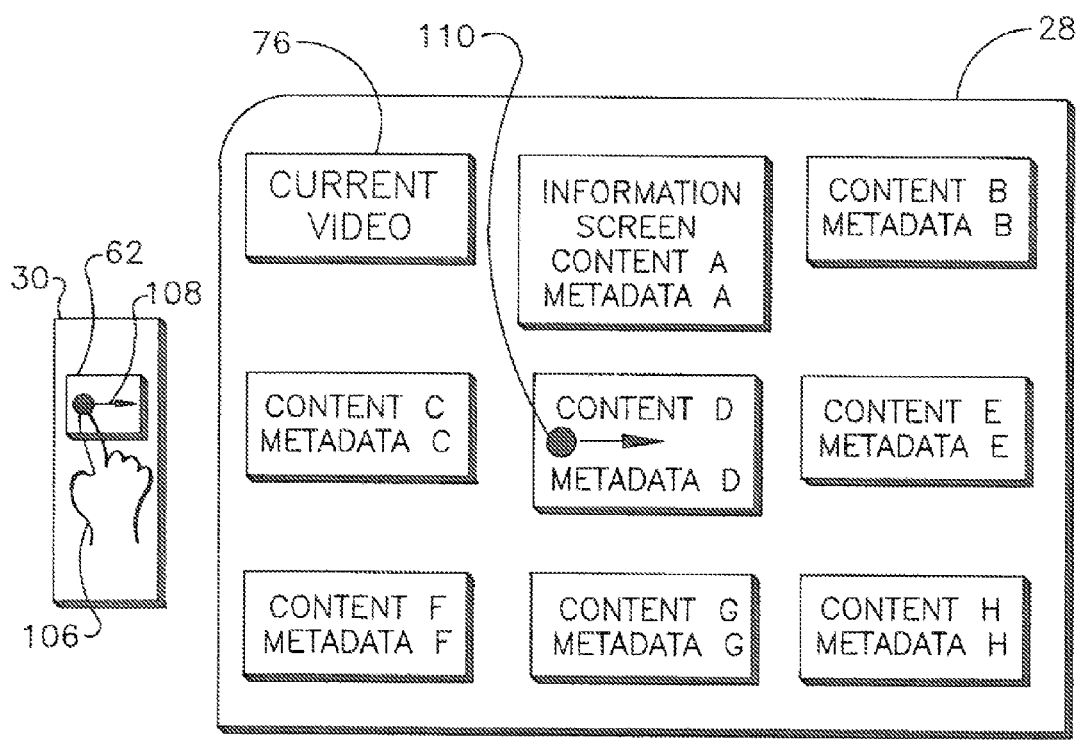
FIG. 5 is a screen shot schematically juxtaposing the RC with the display to show a horizontal click and drag movement on a nine-panel GUI with a summary level of program metadata.
Figure 6:
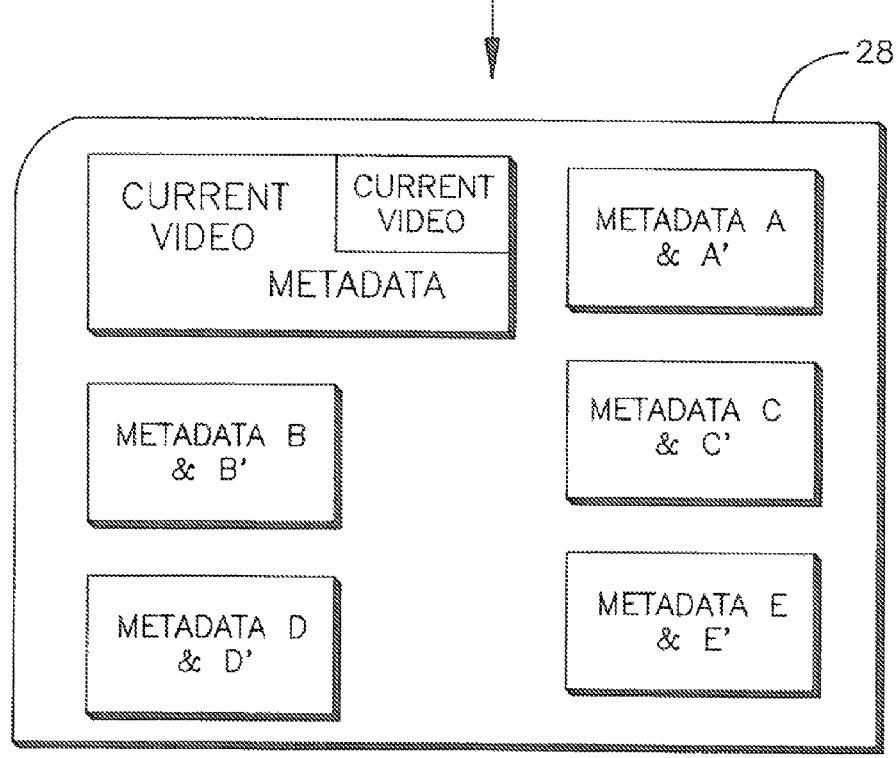
FIG. 6 is a screen shot showing that the result of the horizontal click and drag movement on the nine-panel GUI is a six-panel GUI with a more detailed level of program metadata.

FIG. 5 is a simplified rendering of the nine panel GUI of FIG. 3 juxtaposed schematically with the RC 30 to illustrate that a horizontal click and drag operation on the touch pad 62 by a viewer's hand 106 (as but one example of how a horizontal motion input can be effected) as indicated by the arrow 108 causes a screen cursor 110 to likewise move right as indicated by the arrow on the display 28, which is interpreted by the processor 18 as a command to transition from the nine panel GUI of FIG. 5 to the six panel GUI of FIG. 6.

In FIGS. 5 and 6, "metadata X" whether in FIG. 5 or 6 refers to metadata concerning the content "X" represented by the associated panel, while "metadata X+X'" refers to greater metadata, namely, the metadata "X" plus additional metadata X' associated with the content "X" represented by the associated panel.

With more specificity related to FIGS. 5 and 6, the GUI of FIG. 5 includes, in the example shown, nine information panels including the current video window 76 in the upper left hand portion of the display. As discussed above, each panel in FIG. 5 is associated with respective content that can be played on the AVDD. Furthermore, note that the panels in the GUI of FIG. 5 present a summary degree of metadata describing the respective content relative to the degree of metadata of the panels in the GUI of FIG. 6. Specifically, the GUI of FIG. 6 displays only six information panels as shown, each being larger than any of the nine panels in FIG. 5 and each being associated with respective content that can be played on the AVDD. Note further that the panels in the GUI of FIG. 6 present a detailed degree of metadata describing the respective content in that the detailed degree of metadata in FIG. 6 includes more metadata than the summary degree presented by the GUI panels of FIG. 5.

In the example shown in which the GUI of FIG. 5 contains nine information panels and the GUI of FIG. 6 contains only six panels, the nine panels can be arranged in three rows of three as shown and the six panels of FIG. 6 may be respectively associated with video content which is associated with respective panels in two and only two rows of panels in the GUI of FIG. 5. In particular non-limiting embodiments the two rows of panels in the GUI of FIG. 5 that correspond to the panels in the GUI of FIG. 6 are a top row and a middle row of panels in the GUI of FIG. 5.

While the particular NEXT GENERATION USER INTERFACE FOR AUDIO VIDEO DISPLAY DEVICE SUCH AS TV is herein shown and described in detail, it is to be understood that the subject matter which is encompassed by the present invention is limited only by the claims.

What is claimed is:

1. Audio video device (AVD) comprising:
   processor configured for controlling a video display to present demanded images on the video display under control of the processor;
   computer readable storage medium bearing instructions executable by the processor to:
   present a first graphical user interface (GUI) on the display, the first GUI including a first number of information panels each being associated with respective content that can be played on the AVDD, at least some panels in the first GUI presenting a summary degree of metadata describing the respective content; and
   responsive to a viewer motion input while the first GUI is presented, remove the first GUI from the display and present a second GUI on the display the viewer motion not being interpreted by the processor as being directed to any particular panel of the first GUI, the second GUI including a second number of information panels each being associated with respective content that can be played on the AVDD, the second number of information panels being fewer than the first number of information panels in the first GUI, at least some information panels in the second GUI presenting a detailed degree of metadata describing the respective content, the detailed degree including more metadata than the summary degree, wherein the first GUI has first, second, and third rows of information panels, the second GUI has information panels each corresponding an information panel from only first and second rows of information panels of the first GUI, and the information panels in the first and second rows of the first GUI establish the first and second rows of information panels in the second GUI, the information panels in the second GUI being larger than corresponding information panels in the first GUI.

2. The AVD of claim 1, wherein the first number is nine.

3. The AVD of claim 1, wherein the second number is six.

4. The AVD of claim 1, wherein the first number is nine and the nine panels in the first GUI are arranged in three rows of three, the second number is six, and the six panels in the second GUI are respectively associated with video content which is associated with respective panels in two rows of panels in the first GUI.

5. The AVD of claim 4, wherein the two rows of panels in the first GUI that correspond to the panels in the second GUI are a top row and a middle row of panels in the first GUI.

6. The AVD of claim 1, wherein all panels in the second GUI are larger than any panel in the first GUI.

7. The AVD of claim 1, wherein the viewer motion is a horizontal click and drag motion on an input device.

8. A method for enabling a viewer of an audio video device (AVD) to transition from a first graphical user interface (GUI) showing a summary degree of metadata to a second GUI showing a higher degree of metadata, comprising:

receiving a user motion input while the first GUI is presented;

correlating the input to a command to transition to the second GUI; and responsive to the command, removing the first GUI from the AVD and presenting the second GUI on the AVD wherein the first GUI has first, second, and third rows of information panels, the second GUI has information panels each comes ondin an information panel from only first and second rows of information panels of the first GUI, and the information panels in the first and second rows of the first GUI establish the first and second rows of information panels in the second GUI, the information panels in the second GUI being larger than corresponding information panels in the first GUI the user motion not being directed to a particular panel of the first GUI.

9. The method of claim 8, wherein the user motion input is a horizontal motion against an input device.

10. The method of claim 8, wherein the first GUI includes nine information panels arranged in three rows of three, the second GUI includes six information panels respectively associated with video content which is associated with respective information panels in two rows of information panels in the first GUI.

11. The method of claim 10, wherein the two rows of panels in the first GUI that correspond to the panels in the second GUI are a top row and a middle row of panels in the first GUI.

12. The method of claim 8, wherein both GUIs present information panels and all panels in the second GUI are larger than any panel in the first GUI.

13. Apparatus, comprising:

user input device;

display device receiving signals from the user input device, at least a first one of which signals is generated by translational motion of a person's hand against the input device; and processor responsive to the first one of the signals changing a level of metadata presented on the display device from more to less metadata, or from less to more metadata, a current video pane being presented in an unchanging location on the display device in both levels of metadata;

wherein the processor changes the level of metadata by changing from m a first GUI to a second GUI, and wherein the first GUI has first, second, and third rows of information panels, the second GUI has information anels each corresponding an information panel from only first and second rows of information panels of the first GUI and the information panels in the first and second rows of the first GUI establish the first and second rows of information panels in the second GUI, the information panels in the second GUI being larger than corresponding information panels in the first GUI the motion of the person's hand not being interpreted as being directed to a particular panel of the first GUI.

14. The apparatus of claim 13, wherein the first GUI includes a first number of information panels each being associated with respective content that can be played on the display device, at least some panels in the first GUI presenting a summary degree of metadata describing the respective content, and the second GUI includes a second number of information panels each being associated with respective content that can be played on the display device, the second number being fewer than the first number in the first GUI, at least some panels in the second GUI presenting a detailed degree of metadata describing the respective content, the detailed degree including more metadata than the summary degree.

15. The apparatus of claim 14, wherein the first number is nine.

16. The apparatus of claim 14, wherein the second number is six.

17. The apparatus of claim 14, wherein the first number is nine and the nine panels in the first GUI are arranged in three rows of three, the second number is six, and the six panels in the second GUI are respectively associated with video content which is associated with respective panels in two rows of panels in the first GUI.

18. The apparatus of claim 17, wherein the two rows of panels in the first GUI that correspond to the panels in the second GUI are a top row and a middle row of panels in the first GUI.

* * * * *